Sept. 29, 1942.   H. NERWIN   2,297,494
PHOTOGRAPHIC CAMERA
Filed Jan. 4, 1941   2 Sheets-Sheet 1
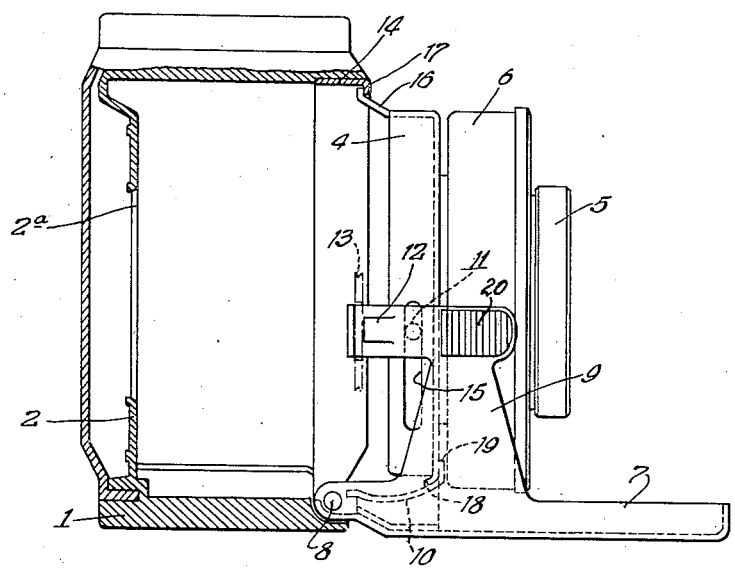
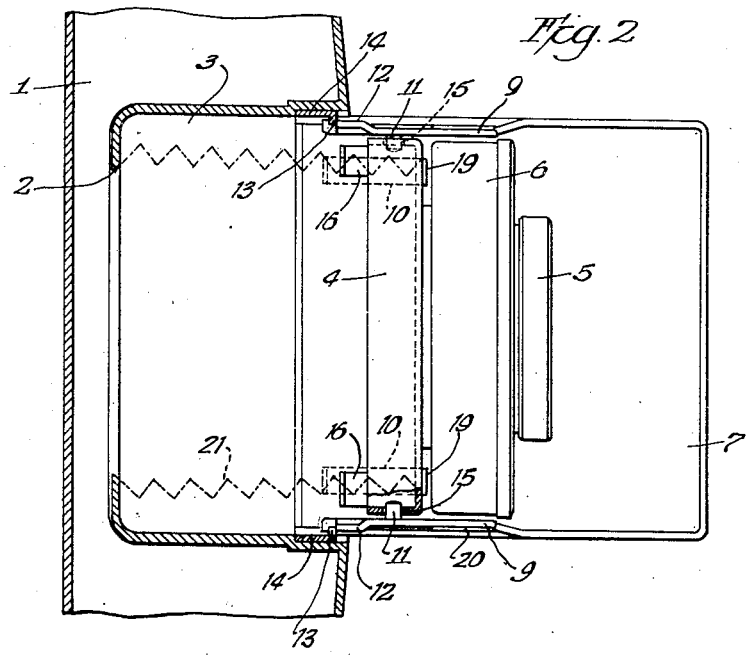
Inventor:
Hubert Nerwin Sept. 29, 1942.   H. NERWIN   2,297,494
PHOTOGRAPHIC CAMERA
Filed Jan. 4, 1941   2 Sheets-Sheet 2
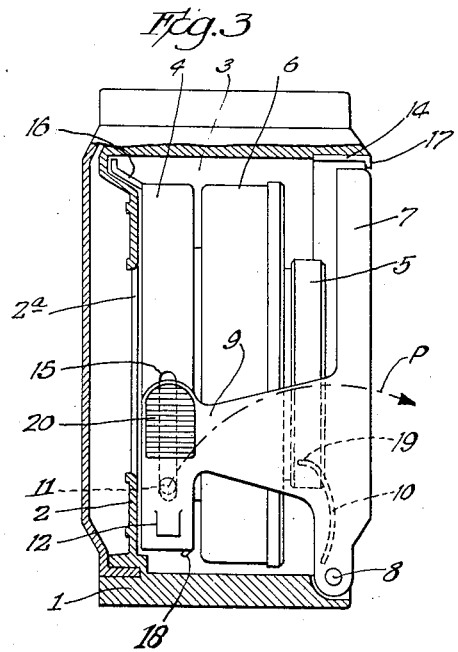
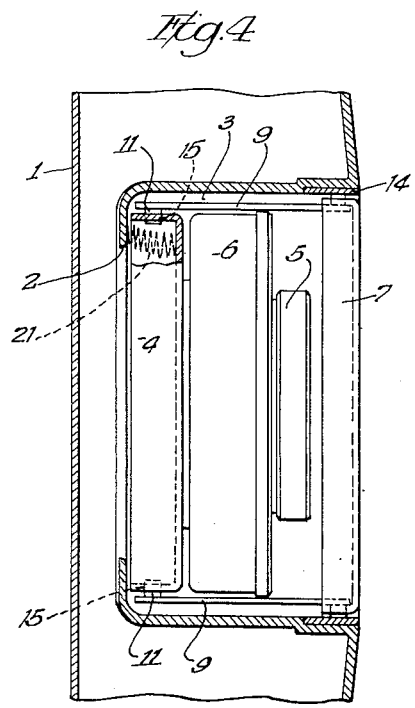
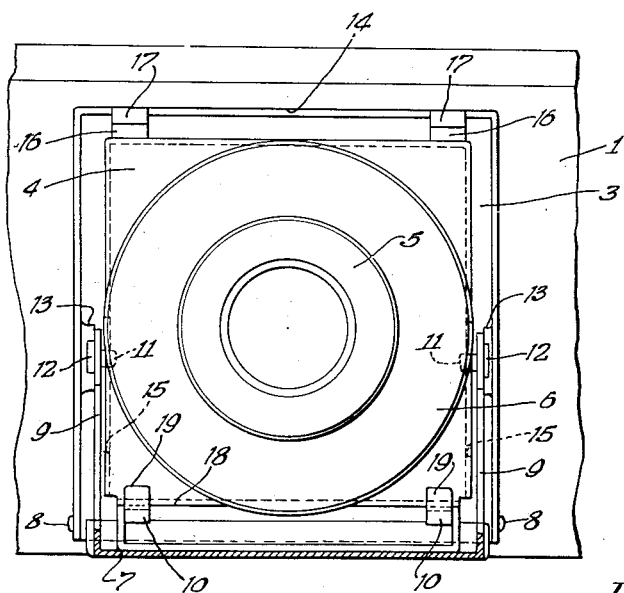
Inventor:
Hubert Nerwin
BY:
Singer, Ehlert, Stern & Carlberg
Attys:

Patented Sept. 29, 1942

2,297,494

UNITED STATES PATENT OFFICE 2,297,494

PHOTOGRAPHIC CAMERA

Hubert Nerwin, Dresden, Germany; vested in the Alien Property Custodian

Application January 4, 1941, Serial No. 373,095
In Germany September 4, 1939

5 Claims. (Cl. 95—40)

The invention relates to improvements in photographic cameras and more particularly to folding cameras in which the camera objective is automatically advanced into operative position as soon as the camera front cover is opened.

The principal object of the invention is to provide the camera with a novel and an extremely simple and inexpensive mechanism which automatically advances the camera objective into its extended operative position when the front cover of the camera is opened. The mechanism of the present invention consists of a few parts only, the number of which is much smaller as in mechanisms which heretofore have been used for the same purpose.

Another object of the invention is to provide the front cover of the camera casing with fixedly attached or integral bracket arms which serve as the sole means for transporting the camera objective into its extended operative position and returning it into the camera casing when the cover is closed.

It is also an object of the invention to provide the bracket arms on the front cover with means for locking the camera objective in its operative position when the front cover of the camera casing has been fully opened.

Still another object of the invention is to provide the camera with a mechanism for the purpose set forth which requires very little space and therefore permits the use of a camera casing of relatively small size, which is of particular importance and advantage when the improvement of the present invention is applied to miniature cameras.

Other objects of the invention will be apparent or will be specifically pointed out in the description forming a part of this specification, but the invention is not limited to the embodiment of the invention herein described, as various forms may be adopted within the scope of the claims.

In the drawings:

Fig. 1 is a side elevation view of a camera of the present invention, with parts of the camera casing in section and with the camera objective in its extended operative position.

Fig. 2 is a top plan view of the camera when in open operative position, with parts in section and other parts broken away.

Fig. 3 is a side elevation view of the camera similar to Fig. 1, except that the camera is folded into its inoperative position with the front cover of the camera casing closed.

Fig. 4 is a view similar to Fig. 2, except that the camera is shown in its folded inoperative position, and Fig. 5 is a front elevation view of the camera in its unfolded operative position, with the end portions of the camera casing broken away.

Referring to the drawings, the camera casing 1 is provided in front of the interior partition 2, which contains the picture window 2ª, with a compartment 3 for receiving, when the front cover 7 of the casing is closed, the extensible carrier 4 on which is mounted in conventional manner the central shutter 6 and the camera objective 5. In the folded position of the camera the compartment 3 is closed by the front cover 7, as shown in Figs. 3 and 4.

The front cover 7 is pivotally attached to the camera casing 1 to rotate about an axis 8. On both sides of the cover 7 is arranged a T-shaped bracket 9 which extend substantially perpendicular to the cover 7. Adjacent each bracket 9 and attached to the cover 7 is a guide rail 10, the front ends of which are bent upwardly to form a stop 19 for a purpose to be described later. The upper transversely extending ends of the T-shaped brackets 9 are each provided on their inwardly facing sides with a pin 11 which project into a slot 15 on each side of the objective carrier 4. The rearwardly extending ends of the upper transverse portion of the brackets 9 are each provided with a spring-like tongue 12, preferably stamped from the body of the bracket 9. These tongues 12 are adapted to engage bar-like projections 13 on the vertical legs of an U-shaped frame 14 which is mounted in the front end of the compartment 3 of the camera casing. The U-shaped frame 14 is so mounted in the camera casing 1 that the cross bar which connects the two legs comes to lie next to the top wall of the camera casing 1, while the ends of the legs come to lie near the bottom wall of the camera casing 1 and are used as bearings for the pivot pin 8 of the front cover 7.

The objective carrier 14 is provided at its upper end with upwardly bent projections 16 adapted to engage downwardly bent projections 17 on the cross bar of the frame 14 when the camera is unfolded and the objective reaches its operative position. The lower end 18 of the objective carrier 4 is slidably supported by the guide rails 10 and in its operative position engages the upwardly bent ends 19 of the same.

When the camera is to be unfolded the operator actuates a latch (not shown) which in well known manner releases the closed front cover 7 from its locked position with the camera casing and a spring (not shown) becomes active at once and kicks the cover 7 into its open position as shown in Figs. 1 and 2. During this opening movement of the front cover 7, the pins 11, which extend into the slots 15 of the carrier 4 move the latter and therewith the shutter 6 and the objective 5 in the direction of the arrow P (Fig. 3) from the position shown in Fig. 3 to the position shown in Fig. 1 i. e. into the extended operative position.

The guide rails 10 and the frame 14 insure a correct erection and positioning of the carriers 4 and the parts 5 and 6 carried by the same. When the opening movement of the front cover 7 is completed the brackets 9 owing to the tongues 12 will be in locked engagement with the bars 13 and the parts 16 and 18 will rest solidly against the parts 17 and 19 respectively, thus holding the objective 5 firmly in a position in which it is focused to infinity. In order to adjust the objective 5 for other distances, the front lens of the objective 5 may be made axially adjustable or the entire objective 5 may be made axially adjustable, for instance by means of a screw threaded mount.

When the camera is to be folded into its closed inoperative position, it merely is necessary to slightly press the two brackets 9 toward each other by engaging the roughened finger pieces 20 on the brackets 9 so that the tongues 12 are released from the bars 13 on the frame 14, whereupon the front cover 7 can be swung toward closed position. During this closing movement the objective carrier 4 is moved straight into the compartment 3 of the camera casing 1, owing to the action of the pins 11 extending into the slots 15 of the carrier. The camera bellows 21 is hereby folded together as may be noted from Fig. 4.

The above invention, as far as it relates to the novel means for moving the objective carrier automatically into its operative position when the front cover of the camera is opened, may also be employed for cameras provided with a focal plane shutter. The foldable bellows 21 of the camera may also be substituted by a telescopically extensible tubular structure. The yieldable brackets 9, which in the described embodiment are formed integral with the front cover 7, may be produced separately and attached fixedly to the cover 7 in any desired suitable manner. The spring-like tongues 12 may also be made separately and attached to the brackets 9. Furthermore, the pins 11 may be attached to the objective carrier, in which case the slots 15 are to be provided in the brackets 9, but the slots have to be rotated about 90° relatively to the position shown in the above described embodiment.

The guide rails 10 and projections 16, 17 which in the embodiment shown are arranged symmetrically with respect to the center axis of the camera may also be so arranged that the objective carrier 4 is brought in engagement with three stops, for instance with one stop formed by the end of a single guide rail below the carrier and two projections 17 on the frame 14 or vice versa. The roughened finger areas 20, which as shown are arranged on the upper transverse end portions of the T-shaped brackets 9, may also be arranged on other portions of the brackets 9. These and other modifications are believed to be clearly within the scope of the present invention.

What I claim is:

1. In a photographic camera, a camera casing provided with an objective carrier compartment and with a pivotally mounted front cover for said compartment, a camera objective carrier provided on opposite sides with a slot, a pair of brackets fixed to the front cover, a pin on each bracket extending into the slot in the adjacent side of said objective carrier, guide means on said front cover for slidably supporting the lower portion of said objective carrier when the front cover is opened, said objective carrier being substantially as large as said compartment in said camera casing, said compartment being provided at its outer edge with fixed stop means against which the upper end of said objective carrier comes to rest when the front cover is opened and the objective carrier, which is caused to move in substantially axial direction outwardly into its extended position by the brackets on said front cover reaches its operative position, and additional fixed stop means on said guide means against which the lower portion of said objective carrier comes to rest when the objective carrier reaches its extended operative position.

2. In a photographic camera, a camera casing provided with an objective carrier compartment and with a pivotally mounted front cover for said compartment, a camera objective carrier provided on opposite sides with a slot, a pair of brackets fixed to the front cover, a pin on each bracket extending into the slot in the adjacent side of said objective carrier, guide means on said front cover for slidably supporting the lower portion of said objective carrier when the front cover is opened, said objective carrier being substantially as large as said compartment in said camera casing, said compartment being provided at its outer edge with fixed stop means against which the upper end of said objective carrier comes to rest when the front cover is opened and the objective carrier, which is caused to move in substantially axial direction outwardly into its extended position by the brackets on said front cover reaches its operative position, additional fixed stop means on said guide means against which the lower portion of said objective carrier comes to rest when the objective carrier reaches its extended operative position, means on said brackets lockingly engaging said camera casing in the open position of said front cover, and manually operable finger pieces on said brackets for moving the latter out of their locked engagement with said camera casing.

3. In a photographic camera, a camera casing provided with an objective carrier compartment and with a pivotally mounted front cover for said compartment, a camera objective carrier provided on opposite sides with a slot, a pair of brackets fixed to the front cover, a pin on each bracket extending into the slot in the adjacent side of said objective carrier, guide rails fixedly mounted on said front cover for slidably supporting the lower portion of said objective carrier when the front cover is opened, said objective carrier being substantially as large as said compartment in said camera casing, said compartment being provided at its outer edge with fixed stop means against which the upper end of said objective carrier comes to rest when the front cover is opened and the objective carrier, which is caused to move in substantially axial direction outwardly into its extended position by the brackets on said front cover reaches its operative position, said guide rails being bent upwardly at their outer ends to form stops against which the lower portion of said objective carrier comes to rest when the objective carrier reaches its extended operative position.

4. In a photographic camera, a camera casing provided with an objective carrier compartment and with a pivotally mounted front cover for said compartment, a camera objective carrier provided on opposite sides with a slot, a pair of brackets fixed to the front cover, a pin on each bracket extending into the slot in the adjacent side of said objective carrier, guide rails fixedly mounted on said front cover for slidably supporting the lower portion of said objective carrier when the front cover is opened, said objective carrier being substantially as large as said compartment in said camera casing, said compartment being provided at its outer edge with fixed stop means against which the upper end of said objective carrier comes to rest when the front cover is opened and the objective carrier, which is caused to move in substantially axial direction outwardly into its extended position by the brackets on said front cover reaches its operative position, said guide rails being bent upwardly at their outer ends to form stops against which the lower portion of said objective carrier comes to rest when the objective carrier reaches its extended operative position, means on said brackets lockingly engaging said camera casing in the open position of said front cover, and manually operable finger pieces on said brackets for moving the latter out of their locked engagement with said camera casing.

5. In a photographic camera, a camera casing provided with an objective carrier compartment and with a pivotally mounted front cover for said compartment, a camera objective carrier, a pair of brackets fixed to the front cover and having each a rearwardly extending arm, a pin and slot connection between said arms and said objective carrier, guide means on said front cover for slidably supporting the lower portion of said objective carrier when the front cover is opened, said objective carrier being substantially as large as said compartment in said camera casing, said compartment being provided at its outer edge with fixed stop means against which the upper end of said objective carrier comes to rest when the front cover is opened and the objective carrier, which is caused to move in substantially axial direction outwardly into its extended position by the brackets on said front cover reaches its operative position, and additional fixed stop means on said guide means against which the lower portion of said objective carrier comes to rest when the objective carrier reaches its extended operative position.

HUBERT NERWIN.